United States Patent Office 3,817,777
Patented June 18, 1974

3,817,777
SOLID-PHASE SYNTHESIS SUPPORT
Csaba Horvath, Orange, and Seymour R. Lipsky, Woodbridge, Conn., assignors to Hoffmann-La Roche Inc., Nutley, N.J.
No Drawing. Application Dec. 12, 1970, Ser. No. 100,368, now Patent No. 3,725,111, which is a continuation-in-part of abandoned application Ser. No. 14,182, Feb. 25, 1970. Divided and this application Aug. 30, 1972, Ser. No. 284,797
Int. Cl. C03c 17/32
U.S. Cl. 117—100 S                                    7 Claims

ABSTRACT OF THE DISCLOSURE

A support medium consisting of a highly swellable polymer resin coated on a fluid impervious, shaped core material is described. In specific embodiments, glass beads are provided with a coating of a highly swellable low-cross linked polymer such as polystyrene. Reactive groups, such as the chloromethyl group, are introduced into the polymer coating. The aforesaid support medium is useful in the solid phase synthesis of complex molecules such as polypeptides, polynucleotides, polysaccharides, proteins, polyamides and the like.

RELATED APPLICATIONS

This is a division of application Ser. No. 100,368 filed Dec. 12, 1970, now U.S. Pat. 3,725,111, issued Apr. 3, 1973, which in turn is a continuation-in-part of Ser. No. 14,182 filed Feb. 25, 1970, now abandoned.

BACKROUND OF THE INVENTION

The concept of utilizing solid-phase synthesis procedures for the preparation of biologically active peptides and proteins was first advanced by Dr. R. B. Merrifield. He recognized the need for a rapid, quantitative, automatic method for the synthesis of long-chain peptides. He conceived of a procedure which involves attaching the initial component amino acid to an insoluble polymeric material and then building up the chain to the desired length by the sequential addition of various activated protected amino acids in a predetermined order. Each intermediate cycle would involve removal of the protecting group on the last amino acid on the chain followed by coupling of the next selectively protected amino acid until the desired peptide chain is obtained. In a final step the peptide would be removed from the support medium. An excellent summary of this procedure is contained in Dr. Merrifield's Lasker award lecture published in the Journal of the American Medical Association, Vol. 210, No. 7 (Nov. 17, 1969) at pages 1247–1254.

The disclosure of Dr. Merrifield's work prompted an extensive amount of research by other workers with the aim of developing improved polymer systems to act as support in the solid-phase synthesis. Work was also directed to improving the amino acid blocking groups, the reaction conditions employed in adding and splitting off of protecting groups, the conditions used in linking the initial amino acid to the polymer and the conditions for the ultimate removal of the complex molecule from the polymer chain. The extensive nature of this work is well summarized in Dr. Merrifield's review article entitled "Solid-Phase Peptide Synthesis," Advan. Enzymol. 32: 221–296, 1969.

The advantages which are potentially available from the utilization of a solid-phase synthesis system include the simplification and acceleration of multi-step syntheses because of the possibility of being able to carry out all the reactions in a single reaction vessel thereby avoiding the manipulations and attendant losses involved in repeated transfer of materials; the avoiding of large losses normally encountered during isolation and purification of intermediates since such intermediates are bound to an isoluble phase throughout the synthesis; acceleration of the purification of intermediate products because they do not have to be isolated; the amenability of such systems to adaptation of automated and mechanized procedures; the obtaining of high yields of final product of good purity through the use of excess reactants to force the individual reactions to completion; and the ability to prepare compounds synthetically which otherwise would not be readily obtainable by conventional methods.

However, in order to bring such advantages to practical fruition it is necessary that the polymeric support utilized meet several stringent requirements. For example, it is necessary that such support materials be completely insoluble in all solvents which are used in the synthesis and should be both chemically and physically stable. Additionally, the polymeric material must possess a structure and form which permits rapid difusion of reagents into the reactive site and easy removal of reagents and by-products by filtration and washing. The support must have large pore dimensions in order to facilitate completion of each step of the synthesis even if the growing peptide chain contains a large number of amino acids. Finally, the support must contain a functional group which will allow ready attachment of the first synthetic component, e.g., the first amino acid by a stable, covalent bond.

The solid supports most generally employed in solid-phase synthesis are currently based on a copolymer of styrene and divinyl benzene. These materials are gels with a random network of loosely cross-linked polystyrene chains. Modifications in this system have generally been directed to the degree of cross-linking, physical form, or added functional groups. It is to be noted that the degree of cross-linking determines the extent of swelling, thus the effective pore size, and the mechanical stability of the support. These properties in turn determined the suitability of the polymers for solid-phase synthesis. It has been observed in the art that polymers containing from 1 to 2% cross-linking are generally most preferable since reducing the amount of cross-linking below this level has resulted in polymer particles of poor mechanical stability which fragment during the synthesis and of which purification and filtration proved to be extremely difficult.

In order to overcome diffusion limitations restricting free access of reactant molecules to reactive sites on the polymer support which are exhibited to a substantial degree with the 1 to 2% cross-linked polymers, the prior art has tried macroporous, also called macroreticular, resins. These resins are rigid copolymers containing large pores fixed by a high degree of cross-linking. However, these resins proved to be inadequate for the synthesis of complex large chain compounds in that a progressively decreasing extent of reaction was observed as the peptide chain was lengthened. It was concluded that a gel-like polymer that swells freely would provide a less hindered matrix and therefore a more satisfactory support.

A further possibility that was explored was to utilize low cross-linked polymers that were in a popcorn rather than a bead form. It was found, however, that while the initial velocity with the popcorn polymer was faster than for the beads, the reaction did not go to completion and it was apparent that a steric barrier was present. Additionally, the popcorn polymer was found not to swell appreciably in organic solvents and were of low density thereby making their use with high density solvents less desirable. This work is summarized in several papers by Letsinger and various co-workers appearing in *J. Polymer Sci. A–1*, 5, 1977 (1967); *J. Am. Chem. Soc.* 85, 3045 (1963); and *J. Am. Chem. Soc.* 86, 5163 (1964).

BRIEF DESCRIPTION OF THE INVENTION

The present invention relates to an improved solid support medium, its use in the solid-phase synthesis of complex molecules and to methods for its preparation. In particular, the support medium of the present invention comprises a swellable, low cross-linked polymer coated onto a mechanically stable, dense, fluid impervious shaped support. The polymer coating is characterized in containing reactive functional groups which can couple with the first component molecule of the complex compound to be synthesized. The support medium of the present invention exhibits properties which provide it with substantial advantages over the solid supports heretofore known in the solid-phase synthesis art. The polymer coating of the present solid support medium is cross-linked to a very low level and thus exhibits substantial swelling leading to a more open polymer structure. In turn such swelling characteristics result in superior kinetics for the initial coupling reaction onto the polymer as well as for the chain addition reactions used in the building up of the complex molecule. This swelling ability is not obtained by sacrifice of mechanical stability of the structure and thus the support materials of the present invention are especially amenable to use in column systems thereby facilitating its adaptation to automated, continuous flow procedures.

The dense, fluid impervious shaped support forming the core of the support medium of the present invention can be selected from a wide variety of materials. Suitable fluid impervious core materials include metals, such as iron, aluminum, copper, silver, gold, lead and the like; metal alloys, such as steel, bronze, brass and the like; metal oxides such as aluminum oxide, silicates and the like; ceramic materials, clays, wood; highly cross-linked resins which may comprise similar or dissimilar polymers utilized in the outer coating of the support material; glass and like materials. The aforesaid core materials may be shaped in any form; particularly those which are conventionally employed in column packing. Suitable shapes include, for example, spheres, Raschig rings, Berl saddles, Steadman packings, wire mesh rings, wire helices and the like. For most purposes in the practice of the present invention it is preferable to utilize spherically shaped fluid impervious core materials. Glass beads represent a particularly preferred embodiment of this aspect of the present invention.

The polymer coating of the support medium of the present invention can comprise polymeric material conventionally used in solid-phase peptide synthesis procedures known in the art. Examples of suitable polymers include polymers derived from styrene, phenol-S-trioxan, methyl methacrylate, vinyl alcohol, cellulose, dextran, vinyl toluene, vinyl xylene, vinyl naphthalene, vinyl ethyl benzene, α-methyl styrene, vinyl chlorobenzene, vinyl dichlorobenzene or mixtures thereof. The aforesaid polymers are cross-linked utilizing conventional cross-linking agents such as divinyl benzenes, divinyl toluenes, divinyl xylenes, divinyl naphthalenes, divinyl ethyl benzenes, etc. In order to provide the desirable swelling characteristics of the solid supports of the present invention, it is preferred that the aforesaid polymers be cross-linked in the range from about 0.01 to 2.00 percent, most preferably in the range of from about 0.05 to 0.50 percent. For the purposes of this application the term "percent of cross-linking" is meant to mean the mole percent of cross-linking agent added to the polymerization mixture. A highly preferred polymer useful in coating the solid support of the present invention is a polystyrene cross-linked with divinyl benzene.

The low cross-linked polymer can be applied to the dense fluid impervious core material by a variety of methods. For example, a polymer resin in the form of beads can be coated onto the desired core material by utilizing the procedure of impact coating such as described in U.S. Pat. No. 2,788,297 issued Apr. 9, 1957 to Louis. Alternatively, the polymer can be applied in the form of a suspension or a paste to the core material whose surface, if desired, can be pretreated with a lacquer or varnish. This technique is described in some detail in U.S. Pat. No. 3,340,085 issued Sept. 5, 1967 to Halasz et al. In another technique the dense, liquid impervious core is a cross-linked vinyl polymeric material such as polystyrene prepared with from about 10 to 30% of a polyvinyl cross-linking agent such as divinyl benzene. The surface of this core material is then coated with the same or a different polymeric material which is then cross-linked with a cross-linking agent in the range of from about 0.01 to 1.00 percent thereby yielding the desired swellable, low cross-linked surface. This procedure is analogous to that described in U.S. Pat. No. 3,252,921 issued May 24, 1966 to Hansen et al. In a further, most preferred technique, a polymer matrix is rendered onto a suitably treated surface of the dense, fluid impervious core material in the form of a thin-layer by polymerizing the monomer mixture of the glass bead surface *in situ* using a technique resembling a suspension (pearl) polymerization method. This latter procedure is discussed in further detail at a further point in this specification.

It is generally desirable that the low cross-linked polymer coated solid support medium of the present invention contain from about 80 to 99.8 weight percent of the dense, fluid impervious core, most preferably from about 95 to 99.8 weight percent, and from about 0.2 to 20 weight percent of the low cross-linked polymer coating, most preferably from about .02 to 5 weight percent.

In order to be able to couple the first component of the complex molecule being synthesized to the polymer it is necessary to provide suitable reactive groups on the polymer surface. A particularly preferred reactive group for use in the present invention is the chloromethyl group which can be introduced by chloromethylating the polymer with chloromethyl methyl ether and a Freidel-Craft catalyst, e.g., stannic chloride. Other reactive groups which may be employed in the practice of the present invention include the following:

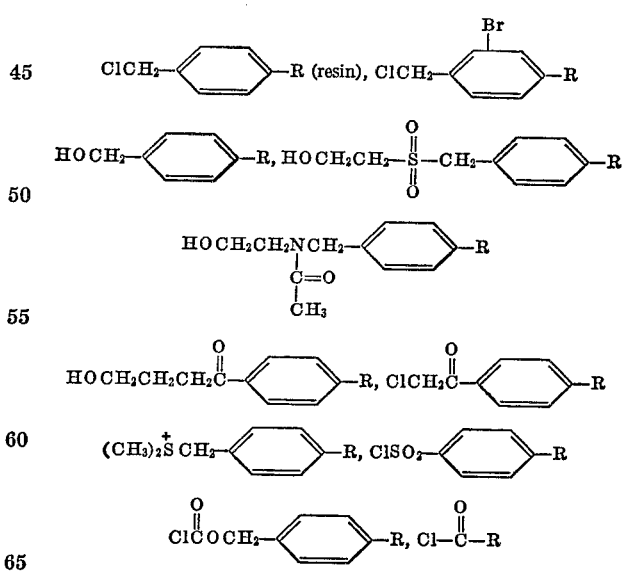

and the like.

In a preferred embodiment of the present invention low cross-linked polystyrene coated glass beads are employed in the solid-phase sythesis of complex molecules. The polystyrene polymer is chloromethylated in this preferred embodiment to supply the necessary functional groups to be used in coupling with the initial component of the complex molecule to be synthesized. The preparation of such polystyrene coated glass beads can be readily accomplished by a multistep process wherein the polymer matrix is formed *in situ* by polymerization of the monomer mixture on the glass bead surface. The steps in this process may be outlined as follows:

(a) Purification of glass beads
(b) Surface treatment of glass beads
(c) Polymerization of monomer mixture on the surface of glass beads
(d) Purification of the polymer
(e) Swelling of the polymer
(f) Chloromethylation
(g) Purification of the chloromethylated resin.

The purification of the glass beads generally includes an initial removal of any iron particles by use of magnets followed by washing of the glass beads with a detergent solution and water. The beads are then rinsed with a water miscible organic solvent such as a lower alkanol, most preferably methanol and then dried.

The surface treatment of the glass beads involves an attachment of preferably organosilicon compounds to the glass surface by chemical reaction or adsorption in order to promote adhesion of the polymer to the glass. It is conveniently accomplished by stirring the dry beads in a dilute solution, e.g., 5%, of a vinyl trihalo silane such as vinyltrichlorosilane in an aromatic hydrocarbon, e.g., benzene, at reflux for one to two hours. The beads are then filtered and rinsed with a lower alkanol such as propyl alcohol and dried.

The resin layer to be rendered onto the glass beads comprises polystyrene cross-linked at from 0.01 to 2.00 percent, most preferably from about 0.05 to 0.50 percent with a cross-linking agent. Any of the conventional cross-linking agents are suitable for this purpose, with divinyl benzene being the cross-linking agent of preference. For the purposes of this invention it is possible to utilize technical grade divinyl benzene which contains various divinyl benzene isomers and other benzene compounds as impurities. Generally a content of about 50% divinyl benzene isomers will be adequate for this purpose. The degree of cross-linking is defined as the weight percent of the cross-linking agent, based on the amount of styrene, added to the monomer mixture. It is to be noted that the amount of cross-linking agent which is present in the polymer prepared by the present method may be more, equal or less than the fraction originally put into the monomer mixture. When utilizing technical grades of cross-linking agent, it is understood, of course, that only the fraction of the pure divinyl benzene or other cross-linking agent contained in the monomer mixture is to be used to calculate the degree of cross-linking.

The polymerization reaction may be initiated by conventional initiating agents. Suitable initiating agents for this purpose include the organic peroxides, such as benzoyl peroxide and ditertiary butyl peroxide. Typical monomer mixtures which can be utilized in the preparation of the polymer coated glass beads for the present invention are given in the following recipe:

1000 to 2000 parts of distilled styrene;
1 to 30 parts of technical divinyl benzene containing 50% divinyl benzene isomers;
3 to 100 parts of peroxide initiator.

Thus, for example, a suitable monomer mixture may contain 1,000 parts of styrene, 5 parts of technical divinyl benzene and 10 parts of benzoyl peroxide to yield a 0.25% cross-linked polymer coating.

The polymerization process is most desirably carried out in a manner that will serve to achieve satisfactory bonding between the treated glass surface and the polymer. It is further desired that the product consist of individually separated glass beads each covered with the requisite polymer coating. It is therefore required that the polymerization process, or at least the final stage thereof, when the polymer becomes hard, be carried out under conditions where the beads, which are covered with the monomer mixture or with a lightly polymerized mixture, are separated from each other. This is achieved by carrying out the entire polymerization or at least its final stage under vigorous stirring in suspension in an aqueous medium containing a suspending agent.

A particularly preferred mode of effecting the polymerization procedure involves utilizing from 50 to 500, most preferably from 100 to 200, parts of glass beads pre-treated as above mixed with from about 2 to 100, most preferably from about 5 to 30, parts of the desired monomer mixture. The mixing should be so intensive that the surface of the beads is wetted completely with the monomer mixture. The wet glass bead mass thus obtained is placed into a resin kettle equipped with a reflux condenser, thermometer and a strong stirrer. Then from 150 to 3000, most preferably from 250 to 1000, parts of an aqueous solution containing from about 148 to 2900, most preferably from about 245 to 920, parts of water and from about 2 to 100, most preferably from about 5 to 80, parts of a suspending agent such as a mixture of polyvinylpyrrolidone or polyvinyl alcohol with a surfactant such as sodium lauryl sulfate is added.

The resin kettle is heated with a water bath to about 70° C. and the glass beads wetted with the water and soluble monomer are stirred occasionally. When the gelation of the monomer begins, which is recognized by an increase in the monomer viscosity and occurs within two hours from the beginning of the heating, the stirrer is turned on and from then on the content of the kettle is stirred vigorously and continuously.

After about three and one-half hours of stirring, the reaction mixture is cooled to room temperature. The supernatant milky dispersion of the polymer which has been washed off from the beads during the process is separated and the product is washed several times with water so that the finally dispersed polymer particles and suspending agent attached to the surface of the beads are completely removed. The product is dried in air or in a vacuum drying oven at a temperature not higher than 80° C. The product consists of polymer coated glass beads, of aggregates of such beads and resin particles which have been detached from the beads during handling of the product.

In a particularly preferred embodiment 10 parts of glass beads, 1 part of the styrene monomer mixture and 25 parts of an aqueous solution containing 22.5 parts of water and 1.5 parts of suspending agent are utilized. This recipe yields about 10 parts of intermediate product.

If desired, the polymerization procedure can be repeated subsequently using polymer coated beads as starting material in order to increase the thickness of the polymer layer.

The product obtained above may be sieved to remove aggregates and fines, although the material can also be used without screening in further reaction steps. Generally, it is desired to utilize a screen having a mesh in the range of that used for screening the starting glass beads. After screening, the yield based on about 10 parts of intermediate product is about 8 to 9.5 parts.

The product can be purified by washing or by treatment in a Soxhlet extractor with a solvent which swells the polymer well such as an aromatic hydrocarbon such as benzene, toluene etc. In this treatment, the monomers, oligomers and the soluble polymer fractions which remain in the resin are removed.

Prior to effecting chloromethylation of the polymer coated glass beads it is necessary that the beads first are swelled in chloromethyl methyl ether. The swelling can be accelerated by utilizing elevated temperatures, e.g., a temperature in the range of from about 30 to 60° C. After the resin layer on the beads is adequately swollen, the chloromethylation is carried out with a mild Friedel-Craft catalyst, for example, stannic chloride. Although the introduction of a large number of chloromethyl groups is desirable to impart high capacity to the resin for the solid state synthesis, the reaction should be terminated before intramolecular cross-linking occurs by the formation of methylene bridges. The chloromethylated product is purified in order to remove the catalyst, soluble fractions of the polymer, paraformaldehyde and other by-products. Generally the resulting product will contain from 2 to 25 weight percent of chlorine based on the weight content of polymer in the coated material.

In a specific embodiment 1,000 g. of polymer coated glass beads are suspended by gentle stirring in 700 ml. of distilled chloromethyl methyl ether placed in a round bottom flask and heated to boiling (59-60° C.). Then the batch is cooled to room temperature and a solution of 18 ml. of distilled stannic chloride in 50 ml. of chloromethyl methyl ether is added dropwise to the suspension. The temperature is raised slowly to the boiling point and the suspension is stirred under reflux for two hours. After cooling, the beads are filtered on a fritted glass filter funnel and washed with a total of 1,000 ml. of dioxane in three portions. Then the beads are suspended in 2,000 ml. of a mixture consisting of 90% dioxane and 10% concentrated hydrochloric acid. The product is filtered again and washed on the filter with 1,000 ml. of the above mixture in small portions. Afterward the beads are washed with a total of 1,000 ml. of dioxane in three portions on the filter and the product is then air dried.

The solid support medium prepared in accordance with the present invention is generally useful in solid-phase synthesis of complex molecules. In such synthesis a poly-functional first component of the complex molecule is utilized. One of the functional groups of this first component is provided in free form suitable for coupling with the reactive group associated with the polymer coating on the solid support medium while the remaining one or more functional groups of the first component are provided in protected form. The first step in the solid-phase synthesis procedure involves the coupling of the first component to the polymer surface via the free functional groups respectively available. After the coupling has been achieved, the functional group utilized in further additions to the component molecule is freed by removal of the protective group. Then the second component provided with one free functional group and remaining groups blocked is added to the first component. The procedure is then repeated with the second component protective groups being removed and added components reacted sequentially thereto by repetition of the above steps. In a final step the completed complex molecule is removed from the polymer. It should be noted that one of the key features of a solid-phase synthesis procedure resides in the fact that the bond selected for coupling the first component to the resin requires more severe conditions for decoupling than is required for the removal of the intermediate blocking groups from the growing chain of components added to the first component.

Therefore, for example, a polypeptide may be synthesized by first adding a protected amino acid, e.g., an amino acid whose free amino group is protected with a tertiary butyloxycarbonyl group, to a chloromethylated polymer coated support medium of the present invention. The coupling reaction produces a protected amino group bonded by an acyl group to the polymer chain. The tertiary butyloxycarbonyl group may then be removed by mild hydrolysis such as by treating with hydrochloric acid-acetic acid using conditions known in the art. The protective group is split off under these conditions but the initial bond of the amino group to the polymer is not effected. A second amino group may then be coupled to the first amino group by utilizing an activating compound such as dicyclohexylcarbodiimide and then the protective group from the second amino acid may be removed in similar manner to that described above. This process can be continued until the desired sequence of amino acids have been built up. In the final step the peptide is removed from the polymer by treating with hydrobromic or hydrochloric acid trifluoracetic acid. The resulting peptide is then recovered from the solution in relatively pure form.

The solid-phase synthesis of complex molecules utilizing the support medium of the present invention can be conducted in reaction vessels conventionally employed in the art for this purpose such as, for example, in shake or rocker flasks. However, it is also possible to utilize the present support medium as a fixed bed in a column reactor which has heretofore not been possible with the low cross-linked polymeric materials of the art due to their poor physical stability properties and the resulting filtration difficulties.

A great advantage derivable from the use of column technology in solid-phase synthesis is the fact that it is possible to employ a process wherein reactants and reagents are passed through the column of the present support medium in continuous fashion in the desired sequence. Thus, the time required for the synthesis of a long chained product is substantially reduced. Moreover, introduction of a fully automated control system for this procedure is more facile than for the alternate methods of operation previously useable in the art.

The present invention is further illustrated by the following examples.

EXAMPLE 1

This example demonstrates the superior swelling properties of representative polymer coated glass beads of the present invention when compared to a commercially available polystyrene bead conventionally employed in solid-phase synthesis by the art. Bead A used in these tests represents the commercial polystyrene bead which is chloromethylated to a chloride content of 2.08 mm./g. of polymer and is cross-linked to a level of about 2% with divinylbenzene. Bead B represents a glass bead coated with a polystyrene cross-linked to a level of 0.25% with divinylbenzene, chloromethylated to a chloride content of 0.04 mm./g. of coated glass bead and which final bead composition comprises about 99.10 weight percent glass and 0.90 weight percent polymer. Finally, Bead C represents a glass bead coated with polystyrene cross-linked to a level of 0.25% with divinylbenzene, chloromethylated to a chloride content of 0.11 mm./g. of coated glass bead and which final bead composition comprises about 84.58 weight percent glass and 15.42 weight percent polymer.

Equal volumes of the aforesaid beads were swelled with a variety of solvents and the swelling capacity determined. The results of these tests are summarized below in Table I.

TABLE I

| | Bead A | | | | Bead B | | | | Bead C | | | |
|---|---|---|---|---|---|---|---|---|---|---|---|---|
| | Dry vol., cc. | Wet vol., cc. | Total frac. vol. incr. | Frac. vol. inc. due to polystyrene [1] | Dry vol., cc. | Wet vol., cc. | Total frac. vol. incr. | Frac. vol. inc. due to polystyrene [1] | Dry vol., cc. | Wet vol., cc. | Total frac. vol. incr. | Frac. vol. inc. due to polystyrene [1] |
| $CHCl_3$ | 10 | 25 | 2.5 | 2.5 | 10 | 12 | 1.2 | 133 | 10 | 33 | 3.3 | 21.4 |
| $CH_2Cl_2$ | 10 | 25 | 2.5 | 2.5 | 10 | 12 | 1.2 | 133 | 10 | 31 | 3.1 | 20.1 |
| Dioxane | 10 | 24 | 2.4 | 2.4 | 10 | 12 | 1.2 | 133 | 10 | 28 | 2.8 | 18.2 |
| DMF | 10 | 23 | 2.3 | 2.3 | 10 | 12 | 1.2 | 133 | 10 | 22 | 2.2 | 14.3 |

[1] Total fractional volume increase/fraction of polystyrene present.

Examination of the above results indicates that the fraction of volume increase to the polystyrene present in Bead B and Bead C indicates volume increases of 133 and 20 times respectively compared to a volume increase for Bead A of about 2.3 to 2.5 times. The increased swellability of the polymer portion of the support medium of the present invention renders these materials extremely suitable to solid-phase synthesis wherein diffusion based limitations are minimized.

EXAMPLE 2

This example demonstrates the efficient manner in which the addition of a first blocked amino acid compound cobonded to a chloromethylene low cross-linked polystyrene coated glass bead of the present invention can be accomplished. The glass bead utilized in this example is Bead B described in Example 1.

In a 100 ml. three-necked flask fitted with a mechanical stirrer and reflux condenser with drying tube, were placed 172 mg. (0.792 mm.) of Boc-valine, 20.0 g. of Bead B, 20 ml. of ethanol and 0.1 ml. (0.713 mm.) of triethylamine (added last). With the flask immersed in an oil bath at 90° C., the mixture was stirred gently by means of a mechanical stirrer for 60 hours. During the stirring process, the stirrer blade was positioned above the surface of the beads to prevent shearing of the polymer, which would result from the grinding action of the stirring blade against the walls of the reaction vessel. After completion of the reaction the resin was filtered onto a tared, coarse-fritted Büchner funnel and washed successively with ethanol, water, methanol and methylene chloride (using three portions of each solvent). The resin was suction-dried and the amount of valine attached to the resin was determined by amino acid analysis to be 0.02 mm./g. This is equivalent to a 50% utilization of the chloromethyl groups available in Bead B. This compares favorably with literature values of 20–40% utilization of chloromethyl groups indicated for the chloromethylated polystyrene beads known in the prior art.

EXAMPLE 3

The procedure of Example 2 was repeated utilizing 120 mg. (0.377 mm.) of Boc-nitro argenine, 10.2 g. of Bead B, 30 ml. of ethanol and 0.0475 ml. of triethylamine for a reaction period of 71 hours and gave a utilization value of 31.6% (0.017 mm./g. of nitro argenine attached to the resin by amino acid analysis). This represents an extremely favorable utilization value since Boc-nitro argenine is known to be a difficult component in coupling reactions with solid-phase supports.

EXAMPLE 4

Preparation of H-Leu-Ala-Gly-Val-OH via shaker flask

I. H-Leu-Ala-Gly-Val-resin ester.—A total of 7.00 g. of Bead B containing Boc-valine as prepared in Example 2 was placed in a Merrifield solid-phase shaker vessel and treated according to the following schedule:

(A)

1. add 50 ml. of dioxane
2. shake for 5 minutes
3. filter solvent
4. repeat steps 1–3 two times (B)

1. add 50 ml. of 4N HCl-dioxane
2. shake for 30 minutes
3. filter solvent (C)

1. add 50 ml. of dioxane
2. shake for 5 minutes
3. filter solvent (D)

1. add 50 ml. chloroform
2. shake for 5 minutes
3. filter solvent
4. repeat steps 1–3 two times (E)

1. add 50 ml. of 10% triethylamine-chloroform
2. shake for 10 minutes
3. filter (F)

1. add 50 ml. chloroform
2. shake for 5 minutes
3. filter
4. repeat steps 1–3 two times (G)

1. add 50 ml. of methylene chloride
2. shake for 5 minutes
3. filter
4. repeat steps 1–3 two times (H)

1. add 674 mg. (3.85 mm., 27.5 equiv.) of Boc-glycine in 40 ml. $CH_2Cl_2$
2. shake 10 minutes (I)

1. add 793 mg. (3.85 mm., 27.5 equiv.) of N,N'-dicyclohexylcarbodiimide dissolved in 10 ml. of $CH_2Cl_2$ (J)

1. add 50 ml. of methylene chloride
2. shake for 5 minutes
3. filter
4. repeat steps 1–3 two times (K)

1. add 50 ml. of absolute ethanol
2. shake for 5 minutes
3. filter
4. repeat steps 1–3 two times The cycle was repeated using 728 mg. (3.85 mm.) of Boc-alanine, and 890 mg. (3.85 mm.) of Boc-leucine. After the final step in the Boc-leucine coupling cycle, the cycle was again repeated up to the end of the second dioxane rinse step (step C).

II. H-Leu-Ala-Gly-Val-OH (cleavage reaction).—The air-dried resin was combined with 70 ml. of trifluoroacetic acid in a cleavage vessel consisting of a 125 ml. dropping funnel with a fritted disc in a 29/42 joint on the bottom. A stream of HBr was bubbled through the mixture for 90 minutes. The liquid phase was collected in a round bottom flask and the resin was rinsed twice with 40 ml. of trifluoroacetic acid, and twice with a 50% mixture of trifluoroacetic acid and methylene chloride. The combined filtrations were evaporated on a rotary evaporator to dryness at 35° C. The residue was dissolved in approximately 10 ml. of methylene chloride and the solution was again evaporated to dryness at 35° C. This procedure was repeated two more times using 10 ml. of methylene chloride each time. The residue was then evaporated from water at 40° C. in the same manner, using approximately 10 ml. of water each time. The residue was then dissolved in approximately 10 ml. of water and treated with a small amount of activated charcoal at approximately 35–40° C. for 10 minutes. The mixture was filtered directly into a 45 ml. lyophilization bottle. On lyophilization, the clear, colorless solution produced 44.8 mg. (yield 63%) of a white, powdery solid. Thin layer chromatography of the product showed one spot corresponding to that of authentic H-Leu-Ala-Gly-Val-OH synthesized with the Merrifield resin. Amino acid analysis ratios were: Leu, 1.00; Ala, 1.00; Gly, 0.97; Val, 1.01.

EXAMPLE 5

An experiment following the procedure of Example 4 was performed using Bead C. It was found that 7.00 g. of this resin produced 28.3 mg. of material having one major spot and a trace of impurity in the thin layer chromatography. The major spot corresponds with that of authentic H-Leu-Ala-Gly-Val-OH.

EXAMPLE 6

Preparation of H-Leu-Ala-Gly-Val-OH via column

The column used was a chromatographic-like column consisting of a 50 ml. burette fitted with a 14/20 joint at the top and a coarse, fritted disc at the bottom. Solvents were gravity-added to the column by means of a reservoir placed on top, and collected in a waste container at the bottom. During the coupling reactions, Boc-amino acid-N,N-dicyclohexylcarbodiimide mixtures were recirculater through the resin by means of a peristaltic pump and recirculated through Compar (polyvinyl alcohol) tubing.

Experimental procedure

Boc-valine loaded Bead B (2.5 g.) as prepared in Example 2 was placed in the column described above and treated according to the following schedule:

a. rinse with 150 ml. of dioxane
b. rinse with 150 ml. of 4 N HCl-dioxane
c. rinse with 150 ml. of dioxane
d. rinse with 150 ml. of chloroform
e. rinse with 150 ml. of 10% triethylamine-chloroform
f. rinse with 150 ml. of chloroform
g. rinse with 150 ml. of methylene chloride
h. recirculate a solution of 35 mg. (0.2 mm., 4 equiv.) of Boc-glycine in 30 ml. methylene chloride for ten minutes
i. add solution of 41.2 mg. (0.2 mm.) of N,N'-dicyclohexylcarbodiimide, and recirculate the mixture for two hours
j. rinse with 150 ml. of methylene chloride
k. rinse with 150 ml. of absolute ethanol.

The cycle (steps a through k) was repeated using 37.8 mg. (0.2 mm.) of Boc-alanine, and 46.2 mg. (0.2 mm.) of Boc-leucine. After completion of step k in the Boc-leucine coupling cycle, steps a through c were repeated to remove the terminal Boc group on leucine.

Cleavage reaction

The cleavage reaction and isolation of the final product were carried out in exactly the same manner as described for Example 3, with the exception that 28 ml. of trifluoroacetic acid was used in this case. The reaction was also carried out in a comparatively smaller vessel (~60 ml.).

The white solid obtained on lyophilization weighed 17.9 mg. (71.1% yield computed as the acetate-dihydrate salt) and produced one major spot and a very faint trace of impurity (slow) on thin layer chromatography. The major spot corresponds with that of authentic H-Leu-Ala-Gly-Val-OH. Amino acid analysis ratios were: Leu, 0.93; Ala, 0.90; Gly, 1.00; Val, 1.06.

EXAMPLE 7

Preparation of L-leucyl-L-alanylglycyl-L-valine

Attachment of t-BOC-L-value to resin.—A solution of t-BOC-L-valine (810 mg., 3.74 mmol) in absolute alcohol (180 ml.) was added to 70 gm. of polystyrene coated glass beads said polystyrene being cross-linked to 0.5% with divinylbenzene and chloromethylated to a chlorine level of 0.056 mm./g. of coated glass bead which bead comprised about 99.22 weight percent glass and 0.78 weight percent polymer, (0.2% chlorine, 3.95 mmol) and 0.47 ml. (3.36 mmol) of triethylamine. The mixture was refluxed gently for 17 hours. After cooling to room temperature the beads were filtered using a 150 ml. coarse fritted funnel and washed with ethanol, water, methanol and methylene chloride and dried under vacuum. The yield was 68 gm. and amino acid analysis showed 22.7 µmol of valine/gm. of resin coated beads.

The detailed procedure for the synthesis of L-leucyl-L-alanyl-glycyl-L-valine in a column using 4.0 g. of the coated bead prepared above is described in the following schedule:

a. rinse with 3 ml. of dioxane;
b. rinse with 5 ml. of 4N HCl-dioxane (wait 1 minute before step c);
c. rinse with 3 ml. of dioxane;
d. rinse with 3 ml. of chloroform;
e. rinse with 3 ml. of 10% triethylamine-chloroform;
f. rinse with 3 ml. of chloroform;
g. rinse with 3 ml. of methylene chloride;
h. treat alternatively with separate portions of—
  (1) 12 ml. of a solution containing 2.12 mm./10 ml. of N,N' - cyclohexylcarbodiimide in methylene chloride;
  (2) 12 ml. of a solution containing 2.12 mm./10 ml. of t-BOC-L-glycine in methylene chloride (wait 8 minutes before step i);
i. rinse with 3 ml. of methylene chloride;
j. rinse with 10 ml. of methanol.

The cycle (steps a through j) was repeated utilizing equivalent concentrations of t-BOC-L-alanine and t-BOC-L-leucine respectively for the t-BOC-L-glycine used above. A temperature of 38° C. was employed for the above processes which temperature was maintained in the column by utilizing a water jacket around the column.

Cleavage of peptide from resin.—To cleave the peptide from the resin, a stream of HBr saturated with trifluoroacetic acid was passed through the column for 2 hours. The excess HBr-trifluoroacetic acid was removed by nitrogen gas for 15 minutes. The peptide was eluted with 1N HCl, adjusted to pH 2.0–2.2. The purity of the product was shown to be 98.61%. For the isolation of the tetrapeptide water was used for elution instead of 1N HCl and the yield was shown to be quantitative after lyophilization. The product was shown to be identical to a known sample of the above-titled compound.

EXAMPLE 8

Preparation of dinitro-bradykinin

Synthesis of t-BOC-nitro-arginyl-polymer.—To a solution of t-BOC-L-nitro-arginine (450 mg., 1.41 mmol) in absolute alcohol (80 ml.) was added 25 gm. of the Ex. 7 resin coated glass beads (0.2% chlorine, 1.41 mmol) and 0.18 ml. (1.27 mmol) of triethylamine. The mixture was refluxed gently for 40 hours. After cooling, the beads were filtered and washed with ethanol, water, methanol and methylene chloride and dried in vacuum. Amino acid analysis showed 11.0 µmol of nitroarginine per gm. of resin coated bead.

The detailed procedure for the synthesis of dinitro-bradykinin in a column using 4.0 g. of the coated bead prepared above is described in the following schedule:

a. rinse with 3 ml. of dioxane;
b. rinse with 5 ml. of 4N HCl-dioxane (wait 9 minutes before step c);
c. rinse with 3 ml. of dioxane;
d. rinse with 5 ml. of chloroform;
e. rinse with 5 ml. of 10% triethylamine-chloroform;
f. rinse with 3 ml. of chloroform;
g. rinse with 3 ml. of methylene chloride;
h. treat alternatively with separate portions of
  (1) 12 ml. of a soluiton containing 2.12 mm./10 ml. of N,N'-cyclohexane carbodiimide in methylene chloride;

(2) 12 ml. of a solution containing 2.12 mm./10 ml. of t-BOC-phenylalanine (wait 8 minutes before step i);
i. rinse with 3 ml. of methylene chloride;
j. rinse with 10 ml. of methanol.

The cycle (steps a through j) was repeated utilizing equivalent concentrations of the following protected amino acids instead of t-BOC-L-phenylalanine in the order indicated:

> t-BOC-L-proline,
> t-BOC-O-benzyl-L-serine,
> t-BOC-L-phenylalanine,
> t-BOC-L-glycine,
> t-BOC-L-proline,
> t-BOC-NO$_2$-L-arginine When employing the last named amino acid, i.e., t-BOC-NO$_2$-L-arginine, dimethylformamide is substituted for methylene chloride in all instances in the preparation. The foregoing procedure was conducted with the column maintained at room temperature.

Cleavage of peptide from resin.—To cleave the peptide from the resin, a stream of HBr saturated with trifluoroacetic acid was passed through the column for 2 hrs. After removing the excess HBr-trifluoroacetic acid by nitrogen gas, the column was eluted with 50 ml. of water which was lyophilized to yield 34.4 mg. of dinitro-bradykinin, thin layer chromatography on silica gel plate using solvent system of nBuOH (1) EtOH (1), HOAc (1), H$_2$O (1) showed one major spot which has the same RF value as a known sample.

EXAMPLE 9

A suspension of 5 grams of polystyrene coated glass beads crosslinked to 0.5% with divinyl benzene said bead containing 0.5 wt. percent resin and 95.5 wt. percent glass beads and are chloromethylated to a chlorine level of 25.6 wt. percent chlorine, in 12 ml. of 80% dimethylformamide was mixed with a solution of 2 g. (41 mmole) of sodium cyanide in 24 ml. of the same solvent. The suspension was sealed and stirred in a 118° C. oil bath for 20 hours. After being cooled to approximately 60° C., the dark, tarry mixture was centrifuged, and the sediment washed with water until the washings were colorless. The dark residue was then washed with 1:3 dioxane-water (5× 20 ml.), 1:1 dioxane-water (5× 20 ml.), 3:1 dioxane-water (5× 20 ml.), dioxane (3× 20 ml.), ethanol (4× 20 ml.), and ether (4× 20 ml.). After removal of the ether in vacuo, the dark material was suspended in 15 ml. of a 1:1:1 mixture of 96% sulfuric acid, glacial acetic acid, and distilled water. The mixture was heated in a 120° C. oil bath for 10 hours, cooled to room temperature, and washed by decantation with water until the washings were neutral. The sediment was then successively washed with: 1:3 dioxane-water (4× 20 ml.), 1:1 dioxane-water (4× 20 ml.), 3:1 dioxane-water (4× 20 ml.), 1:3 dioxane-ethanol (4× 20 ml.), 1:1 dioxane-ethanol (3× 20 ml.), 1:3 dioxane-ethanol (3× 20 ml.), ethanol (4× 20 ml.), and ether (4× 20 ml.). After removal of the ether in vacuo, the tan residue weighed 1.3 grams.

This material was suspended in 5 ml. of toluene, 5 ml. of thionyl chloride were added, and the suspension refluxed overnight with exclusion of moisture. After cooling to room temperature, the solvent was removed by decantation and thionyl chloride washed out with toluene. After several ether washes, the residue was made solvent-free by drying in vacuo. The off-white solid was suspended in 10 ml. of dry pyridine and 1.83 g. (7.55 mmole) of 2'-deoxythymidine were added. The reaction vessel was sealed and stirred at room temperature for 22 hours. Methanol, 1 ml., was added, and the mixture stirred for 22 hours at room temperature. After removal of the solvent by decantation, the solid was washed with pyridine (5× 10 ml.), and ether (5× 10 ml.). After removal of the ether in vacuo, the product weighed 1.29 g.

Reaction of 1.2 g. of this material with 0.165 (0.357 mmole) of 3'-O-acetyl-2'-deoxythymidine-5'-phosphate pyridinium salt and 155 mg. (0.71 mmole) of mesitylene sulfonic acid in 2 ml. of dry pyridine at room temperature overnight produced, after washing (water, ethanol, ether) to remove excess reagents and non-bound products, 0.97 g. of glistening white beads. Reaction of this product with doxane-aqueous ammonia at room temperature overnight produced thymidine-3'-5' thymidylate, 3 mmol, as shown by high pressure anion exchange chromatography and ultraviolet spectroscopy.

We claim:
1. A solid support medium comprising an essentially fluid impervious, shaped core material coated with a highly swellable polymer resin derived from styrene, phenol-S-trioxan, methyl methacrylate, vinyl alcohol, cellulose, dextrin, vinyl toluene, vinyl xylene, vinyl naphthalene, vinyl ethyl benzene, α-methyl styrene, vinyl chlorobenzene, or vinyl dichlorobenzene, cross-linked in a range of from about 0.01 to 2.00 percent with a cross-linking agent selected from the group consisting of divinyl benzenes, divinyl toluenes, divinyl xylenes, divinyl naphthalenes, and divinyl ethyl benzene, said polymer resin containing reactive groups selected from the group consisting of chloromethyl,

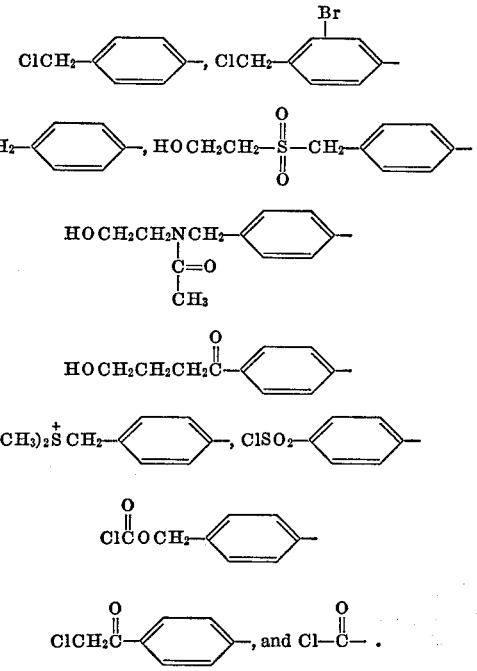

2. The solid support of claim 1 wherein siad shaped core material comprises glass beads.
3. The solid support of claim 1 wherein said polymer coating comprises polystyrene.
4. The solid support of claim 1 wherein said polymer resin is present in the range of from about 0.2 to 20 weight percent and said core material is present in the range of from about 80 to 99.8 weight percent.
5. The solid support of claim 1 wherein said reactive groups comprise chloromethyl groups.
6. The solid support of claim 5 wherein said core material comprises glass beads and said polymer resin comprises polystyrene cross-linked in the range of from about 0.01 to 2.00% with divinylbenzene.

7. The solid support of claim 1 wherein said shaped core material is spherical in shape.

References Cited

UNITED STATES PATENTS

| | | | |
|---|---|---|---|
| 3,507,686 | 4/1970 | Hagenbach | 117—100 S |
| 3,252,921 | 5/1966 | Hansen et al. | 260—79.3 |
| 3,340,085 | 9/1967 | Halasz et al. | 117—100 B |
| 2,876,133 | 3/1959 | Iler et al. | 117—100 S |
| 3,511,697 | 5/1970 | Auken et al. | 117—46 FA |

WILLIAM D. MARTIN, Primary Examiner

D. C. KONOPACKI, Assistant Examiner

U.S. Cl. X.R.

117—62.1, 124 E, 126 GB